Jan. 25, 1944. H. R. BERARD Re. 22,423
HONING MACHINE
Original Filed Nov. 5, 1936
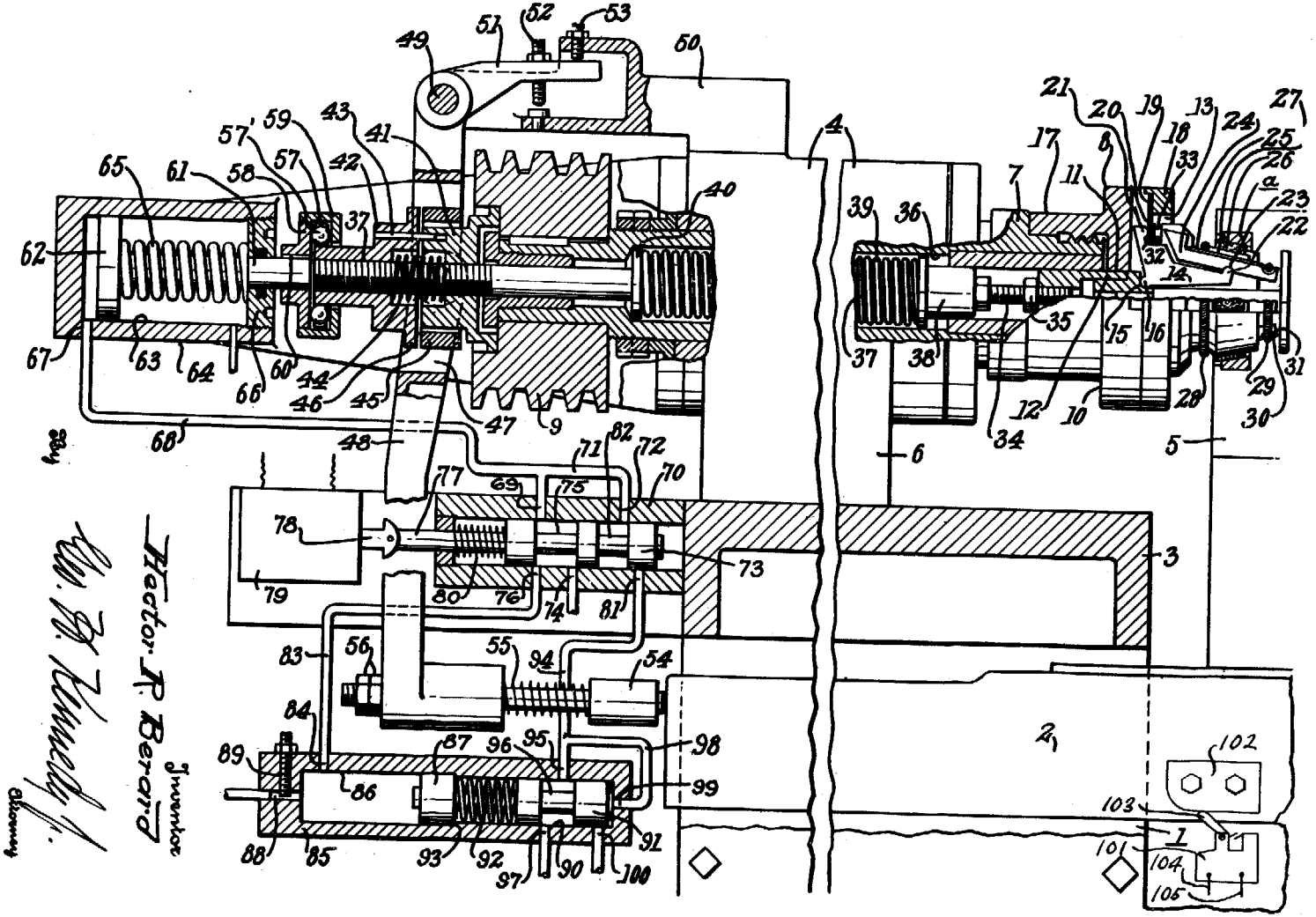
Inventor
Hector R. Berard
By Geo. H. Kennedy Jr.
Attorney Reissued Jan. 25, 1944 Re. 22,423

UNITED STATES PATENT OFFICE 22,423

HONING MACHINE

Hector R. Berard, deceased, late of Worcester, Mass., by The Heald Machine Company, assignee, Worcester, Mass., a corporation of Massachusetts Original No. 2,290,525, dated July 21, 1942, Serial No. 109,329, November 5, 1936. Application for reissue July 20, 1943, Serial No. 495,500

8 Claims. (Cl. 51—92)

The invention relates to honing mechanism adapted to impart a high finish to the surfaces of successively-presented workpieces; the principal object of the invention is to obtain automatically, as each honing operation proceeds, a gradual variation of the pressure exerted by the honing elements against the surface being operated upon.

Other and further objects and advantages of the invention will more fully hereinafter appear from the following detailed description thereof, taken in connection with the accompanying illustrative drawing in which the single figure is a side elevation, partly in section, of honing mechanism in accordance with the invention.

Said drawing shows the invention in connection with an expansible and collapsible hone of the type shown by Blood Patent No. 2,086,660, dated July 13, 1937; said drawing also shows, fragmentarily, certain elements of a more or less conventional honing machine organization, including a machine base 1 and a reciprocatory table 2 which is slidably supported on longitudinal ways, not shown, of said base; the latter carries near one end a stationary bridge 3, spanning said table, and serving as the support either for the hone or for the workpiece, as desired,—with the other of said parts supported on the table 2. In the arrangement shown, the bridge 3 carries the hone and the table 2 carries the work,—but this arrangement could as well be reversed; in either case the table travel, preferably obtained by any well-known fluid pressure mechanism, not shown, serves for the relative movements of hone and workpiece into and out of operative position, and if desired, for a slight relative axial reciprocation between said parts when in operative position.

In the arrangement shown, the table 2 carries a suitable holder or support 5, adapted for the retention of each workpiece *a*, here shown by way of example as of annular form, and presenting a tapered inner surface to be honed. The bridge 3 supports a mounting 6, which includes a housing 4 wherein is suitably journalled a spindle 7, having mounted on one end an expansible and contractible honing device 8, and on the other end a suitable pulley 9, by which rotation is imparted to said spindle from a driving belt, not shown.

The aforesaid Blood Patent No. 2,086,660 exemplifies a type of honing device to which the present invention is applicable, and accordingly the drawing herein shows a honing device 8 of the same construction as disclosed in said Blood patent,—although it is to be understood that the invention is not limited to this particular hone construction, as any other expansible and contractible honing device might be employed. In the illustrated honing device 8, the same as in the hone of said Blood patent, is provided a head or arbor 10 having a hub 17 which is internally threaded for attachment to the rotary spindle 7. In a central bore or opening 11 of said head is slidably mounted a plunger 12, the latter being constrained to rotate with the head, and providing support for the corners of a series of bell-crank levers 14 each occupying a radial slot 13 of said head; to this end each lever at its corner has a rounded projection 16 that seats against a concave shoulder 15 of plunger 12.

On one arm of each lever 14 is an arcuate lug 21, the latter adapted to contact one side of a finger 20 extending into the associated slot 13 from an annular resilient member 19 which is clamped to the head 10 by a ring 18. On the opposite side of fingers 20, the several levers 14 are encircled by an annular coil spring 32 received in annular slots or grooves 33 of head 10, and holding said levers against the plunger 12, so that the latter's sliding movements cause rocking of said levers about the contact points of their lugs 21 with the resilient fingers 20.

The other arm of each lever 14 has an arcuate lug 22 received in a concave recess 23 on the underside of a carrier 24. On the outer side of each carrier 24 is a plate 25 to which is secured as by suitable adhesive, a honing element or stone 26, usually of abrasive material. For holding the plates 25 on their carriers, as well as for holding the carriers on their levers 14, the honing device has encircling coil springs 28 and 29, the former engaging with flanges 27 of the plates and the latter received in plate recesses 30, each matching on its under side with a positioning recess 31 of the associated carrier 24.

These springs 28 and 29 are the means by which the honing device is held yieldingly in its collapsed or contracted condition. The expansion of said device, to operative or working condition is obtained by outward or right hand movement of the slidable plunger 12. To this end said plunger has an adjustable rearward extension, in the form of a bolt 34 adapted to be locked in adjusted position by a clamping nut 35; for engagement with said bolt is provided a slidable member 38 carried on the end of a rod 37 which extends through a bore 36 of spindle 7 and which is surrounded therein by a compression coil spring 39. The latter, in the manner disclosed by Blood and Schmidt Patent No. 2,174,029, of September 26, 1939, seats against a collar or shoulder 40 within said bore and thrusts outwardly against the member 38; in operation, when the rod 37 is free to move to the right, the spring 39, overcoming the hone encircling springs 28 and 29, shifts said rod to move the plunger 12, thereby distending the hone, and thereafter exerts its expansive force to maintain a working pressure of the stones 26 against the surface of the workpiece *a*, until such time as the rod 37 is moved to the left, to permit collapse of the hone by its springs 28 and 29.

The drawing also shows in association with the above-described expansible and collapsible honing device 8, an arrangement, similar to that of said Blood and Schmidt Patent No. 2,174,029, by which wearing away of the stones 26 can be automatically compensated for. To this end, the rod 37, which rotates with the spindle 7, has its left hand end threaded, and carries thereon a nut 41, having a flange which is engageable with the end of pulley 9 to limit the aforesaid right hand movement of rod 37 by spring 39. A second nut 42 on rod 37 is held from turning relative to nut 41 by a pin 43 extending through both nuts, the latter receiving between them a coil spring 44, which places a frictional drag on the two nuts to resist their turning movement, relative to the rod 37. Such a turning movement, to back away the nut 41 from the pulley 9, thus to allow a slightly greater right hand movement of the rod 37, is produced automatically, in response to wearing down of stones 26, in the following manner:

A lever 48 pivoted at 49 on a bracket 50 of housing 4 provides an opening 47, wherein is trunnioned (as shown in said Blood and Schmidt patent) a ring 45, surrounding the nut 41 and spaced slightly from a flange 46 on nut 42. The lower end of lever 48 slidably receives the rod or stem of a plunger 54, the latter being urged to the right, toward the end of table 2, by a spring 55, and said right hand movement being limited by adjustable nuts 56 on said stem. Said member 54 is engaged by table 2, upon the latter's arrival at the position shown which disposes the workpiece *a* in a position to be operated upon by the hone; in said position the usual short rapid table reciprocation is transmitted through member 54 and spring 55 to lever 48, to produce an oscillation of the latter about its pivot 49. The extent or throw of this oscillation is controlled by suitable adjustable stops 52 and 53 cooperating with the bracket 50 and with an arm 51 of lever 48.

Under normal conditions, this oscillation of lever 48 does not produce any contact of ring 45 with the flange 46 of nut 42, because each left hand movement of ring 45 toward said flange is accompanied by a slight movement of rod 37 and nuts 41 and 42 in the same direction, owing to hone contractions occurring on each left hand stroke of the workpiece's reciprocations. But as the stones 26 gradually wear away these left hand displacements of nut 42 gradually decrease in amplitude, until finally there occurs between the ring 45 and the flange 46 a momentary contact under enough pressure to interrupt the rotation of nuts 41 and 42 with the rod 37,—thus backing off said nut 41 a slight amount from the pulley 9, so as to compensate for such wear by increasing slightly the distance which the rod 37 is permitted to move to the right.

The above-described arrangements, being disclosed in the aforesaid prior patents, do not, of themselves, constitute the present invention. The latter is concerned with instrumentalities by which, during the course of each honing operation performed by a device or arrangement of this general character, the pressure exerted by the stones against the workpiece surface may be automatically varied or modulated, in the interests of a finer finish on said surface. For the attainment of this result, the hone must be kept distended by the spring 39 and the latter during each honing operation, must be subjected to forces tending to vary or modulate its effective pressure without changing the positional relationship of the parts.

The drawing shows an arrangement utilizing a fluid under pressure for this purpose, said arrangement including a cylinder 63 provided by a housing 64 which forms an extension of the spindle housing 4; slidable in said cylinder is a piston 62 having a rod 61 which projects through cylinder head 66 toward and in alinement with the rod 37, and which constitutes a non-rotary extension of the latter, by virtue of a special connection, as follows:

The nut 42 on rod 37 has a flange 57 which provides suitable openings for a circular series of balls 57'. Said balls on one side are in contact with a collar 58 which is fastened to rod 61 by a key 60, while on the other side said balls are contacted by the inturned flange of a ring 59 which has threaded engagement with said collar 58. Thus any endwise movement, either of the rod 37 or of the rod 61, is transmitted to the other of said rods by said balls, the latter, however, permitting always the free and substantially frictionless turning of rod 37 relative to the rod 61.

Surrounding said rod 61, between the piston 62 and the head 66 is a relatively heavy coil spring 65, of greater strength than spring 39; thus said spring 65, in the absence of countervailing forces, acts to draw the rod 37 to the left, this causing the hone 8 to collapse, under the force of its encircling springs 28 and 29. The invention provides a mechanism, here shown as a fluid pressure mechanism, for disabling the spring 65 by forces of varying intensity during each honing operation, thus to vary the effective pressure of the spring 39 in holding the distending honing stones 26 to their work, as follows:

The end of cylinder 63 beyond the piston 62 has a port 67 which is connected by a conduit 68 and a branch conduit 71, to ports 69 and 72 respectively, both opening into the bore of a valve casing 70. The latter contains a slidable piston valve 75 having as shown three spaced piston portions for cooperation, as hereinafter described, with the said ports 69 and 72 and also with other ports 74, 76 and 81 which open into said bore. The stem 77 of valve 75 is connected to the armature 78 of a solenoid 79, the latter at the start of the honing operation being energized to hold said valve (against the pressure of a spring 80) in the position shown by the drawing.

Any suitable timer mechanism may be employed for the energization and de-energization of solenoid 79, for example, a timer mechanism similar in character to those employed in the Blood and Schmidt Patent No. 2,174,029 aforesaid, for effecting a desired change in the honing operation after a predetermined lapse of time. As here shown, said timer mechanism includes a timer element 101 on the base 1 of the machine, adapted to be set in operation when an arm 103 thereof is engaged by a cam 102 on the table 2, at the end of the latter's left hand movement into the position shown by the drawing. The timer element 101 has leads 104 and 105 connected in series with the solenoid 79 and with any suitable source of electric current, not shown,—the circuit being closed, to energize the solenoid as the table 2 reaches the illustrated honing position, and said circuit being opened by the timer after the honing has progressed for a predetermined time interval; this time interval can be varied by suitable adjustment of the time element 101. Upon energization of solenoid 79, as the workpiece arrives in honing position, the following action occurs:

Fluid under pressure from any suitable source, not shown, enters the valve bore of casing 70 through a supply port 74 and flows by way of port 69, conduit 68 and port 67 to the cylinder 63, wherein its full pressure is exerted against the piston 62 to overcome and slightly compress the strong spring 65; with the pressure of spring 65 thus nullified, the weaker oppositely-acting spring 39 is rendered free to perform its usual functions, that is (1) to engage the head 38 with the plunger extension 34 to expand the hone and (2) to maintain a substantially constant pressure of the honing stones 26 against the surface of the work *a*.

It is to be noted also, in this solenoid-held position of valve 75 that the pressure fluid supplied by port 74 also has access by way of port 76, conduit 83 and port 84 to the bore 86 of another valve casing 85, said bore 86 containing a slidable plunger 87. Also in casing 85 is a slidable two-part piston valve 91 which works in a bore 90 of slightly smaller diameter than the bore 86 thereof; the plunger 87, by the aforesaid access of pressure fluid to bore 86, is held, as shown, at its extreme right hand position against the shoulder 93 at the juncture of said bores 86 and 90. In this position the plunger 87 engages and compresses a spring 92 whose other end bears against the valve 91 to hold the latter in the position shown; this position of plunger 87 and valve 91 is maintained by the fluid under pressure so long as the solenoid 79 remains energized, and despite the slow leakage of such pressure fluid from the bore 86 through a bleed opening provided by port 88 and its adjustable throttle valve 89.

It should also be noted that fluid under pressure from said source has access to the valve bore 90 by way of a supply port 97, this pressure fluid passing by port 95 to a conduit 94 which terminates in the port 81 of the first-mentioned valve bore, said port 81 being normally covered by the right hand end portion 73 of valve 75; a branch 98 from conduit 94 communicates with port 99 at the right hand end of valve bore 90, but the pressure thus effective on the valve body 91 and tending to move the latter to the left is counteracted normally by the pressure maintained against the slightly larger area of plunger 87, so that this valve 91 maintains its illustrated position which closes off an exhaust port 100, as long as the solenoid 79 stays energized.

The operation or cycle of honing on each workpiece *a* is as follows:

Before the honing operation starts, the table 2 is in its right hand position, with the workpiece *a* spaced axially from the hone; the latter at this time has been collapsed or contracted, preparatory to the table movement which carries the workpiece *a* into its working position, surrounding the hone; such collapse or contraction is due to the fact that the solenoid 79, at this time being de-energized, the valve 75 occupies its extreme right hand position wherein it shuts off the flow of pressure fluid from port 74 to the cylinder 63, this making the spring 65 fully effective, by its preponderance over the spring 39 to draw the head 38 to the left, whereby the hone is free to collapse by the action of its surrounding springs 28 and 29.

The table movement which disposes the workpiece *a* in surrounding relation to the collapsed hone effects, as described above, the energization of the solenoid 79, thus shifting the valve 75 to the left into the position shown by the drawing, whereupon with the access of pressure fluid to the left hand side of piston 62, the pressure of spring 65 is overcome or counterbalanced, thus allowing the spring 39 in its usual manner to distend or expand the hone and for a certain time thereafter during the honing operation to maintain a substantially constant pressure of the honing stones 26 against the inner surface of the workpiece *a*.

The honing operation continues under this substantially constant pressure of the usual spring 39 until, at some predetermined time in the honing cycle the solenoid 79 is de-energized; then, at once, the valve 75 is returned to its right hand position by the spring 80, this cutting off the pressure fluid from port 74 to the cylinder 63, but still for a time keeping the spring 65 disabled, because the pressure fluid from port 97 passing around reduced portion 96 of valve 91 then flows by way of port 95, conduit 94 and port 81 into the bore of valve 75 around reduced portion 82 thereof and thence by way of port 72 and conduits 71 and 68 to the cylinder 63.

But despite this secondary access of pressure fluid to cylinder 63, the force or pressure by which the spring 65 is counteracted grows gradually less and less, because with this shift to the right of valve 75 occurs the cut-off of port 76 through which the pressure fluid from port 74 has previously passed to the valve bore 86; consequently, there occurs a gradual drop in the pressure exerted on plunger 87, due to the bleeding of the trapped fluid through the restricted outlet port 88. As this pressure drops gradually, the valve 91 under the pressure exerted by the fluid against its right hand side moves to the left and gradually opens the exhaust port 100. As more and more of port 100 is uncovered, the pressure of fluid against the piston 62 grows less and less; in other words, the force which counterbalanced and disabled the spring 65 in the beginning, and thereby allowed the spring 39 to function, is gradually being diminished.

Accordingly, it follows that as the spring 65 more and more regains its power, the net honing or working pressure of the stones 26 on the workpiece *a* must grow less and less, since the spring 39 is now being counteracted more and more by the stored-up energy of spring 65. Finally a point is reached where the diminishing fluid pressure on piston 62 gives way to the spring 65, and the latter by its regained preponderance over spring 39 shifts the rod 37 to the left, thereby bringing about the collapse of the hone (by its encircling springs 28, 29) and the termination of the honing operation.

What is claimed is:

1. In a honing machine, a head, a spindle journalled in the head, a hone mounted on one end of the spindle, said hone comprising an arbor, at least one lever mounted in the arbor for rocking movement relative thereto and a honing member carried by said lever, a plunger axially slidable in the spindle, said plunger by axial movement procuring movement of the honing member relative to the arbor into and out of operative position, resilient means engageable with the plunger to urge said plunger axially in one direction, fluid pressure means associated with the plunger to move said plunger in the opposite direction and means to provide for gradual reduction in the pressure of the fluid in said fluid pressure means for varying the pressure exerted by said honing member on the work.

2. In a honing machine, a head, a spindle journalled in the head, a hone mounted on one end of the spindle, said hone comprising an arbor, at least one lever mounted in the arbor for rocking movement relative thereto and a honing member carried by said lever, a plunger axially slidable in the spindle, said plunger by axial movement procuring movement of the honing member relative to the arbor into and out of operative position, resilient means engageable with the plunger to urge said plunger axially in one direction, fluid pressure means associated with the plunger to move said plunger in the opposite direction, said fluid pressure means including a piston and cylinder, one of which is connected to the plunger, means for directing fluid under pressure to said cylinder for movement of the plunger in one direction, and means to provide for a gradual reduction in the pressure of the fluid in the cylinder for a gradual reduction in the pressure exerted by the honing member against a workpiece.

3. In a honing machine, a workholding device, an expansible and collapsible honing device for operation on successive workpieces placed in said workholding device, a table supporting one of said devices and adapted to be moved, before the start of each honing operation, to dispose said devices in honing position, a spring for collapsing said honing device, a fluid-actuated member opposing said spring, means brought into action by said table movement for subjecting said member to fluid under pressure, to expand said honing device and give it a predetermined pressure against the workpiece at the start of each honing operation, and means operating in timed relation to the start of each honing operation for inaugurating a gradual reduction in the pressure exerted by said fluid on said member, whereby said expanded honing device exerts on each workpiece a gradually diminishing pressure for the remainder of the honing operation, until the latter is terminated by collapse of said honing device when the fluid pressure opposing said spring gets low enough for said spring to act.

4. In a honing machine, a workholding device, an expansible and collapsible honing device for operation on successive workpieces placed in said workholding device, a table supporting one of said devices and adapted to be moved, before the start of each honing operation, to dispose said devices in honing position, a spring arranged to expand said honing device and to give it a predetermined pressure against each workpiece, a second spring of greater strength than the first spring and arranged in opposition thereto, for procuring collapse of said honing device, a fluid-actuated member opposing said second spring, means brought into action by said table movement for subjecting said member to fluid under sufficient pressure to disable said second spring, thereby making said first spring fully effective on said honing device at the start of each honing operation, and means operating in timed relation to the start of each honing operation for inaugurating a gradual reduction in the pressure exerted by said fluid on said member, thereby to gradually diminish, during the remainder of the honing operation, the effective honing pressure supplied by said first spring, until said second spring, by regaining its preponderance over said first spring, procures the collapse of said honing device.

5. In a honing machine, an expansible and collapsible honing device for operation on successively presented workpieces, a spring for collapsing said hone and a fluid actuated member opposing said spring, valve means made effective by disposal of honing device and workpiece in honing position for subjecting said member to fluid under pressure, to expand said honing device and give it a predetermined pressure against the workpiece at the start of each honing operation, and means operating in timed relation to the start of each honing operation for inaugurating a gradual reduction in the pressure exerted by said fluid on said member, whereby said expanded honing device exerts on each workpiece a gradually diminishing pressure for the remainder of the honing operation, until the latter is terminated by collapse of said honing device when the fluid pressure opposing said spring gets low enough for said spring to act.

6. In a honing machine, an expansible and collapsible honing device for operation on successively presented workpieces, a spring for collapsing said hone and a fluid actuated member opposing said spring, valve means made effective by disposal of honing device and workpiece in honing position for subjecting said member to fluid under pressure, to expand said honing device and give it a predetermined pressure against the workpiece at the start of each honing operation, said valve means discontinuing the supply of pressure fluid to said member after a predetermined duration of each honing operation, and other valve means brought into operation by said discontinuance for subjecting said member to said fluid under a gradually diminishing pressure, whereby said expanded honing device exerts on each workpiece a gradually diminishing pressure for the remainder of the honing operation, until the latter is terminated by collapse of said honing device when the fluid pressure opposing said spring gets low enough for said spring to act.

7. In a honing machine, an expansible and collapsible honing device for operation on successively presented workpieces, a spring for collapsing said hone, fluid pressure-actuated means opposing said spring and rendered operative by disposal of honing device and workpiece in honing position to expand said honing device and give it a predetermined pressure against the workpiece at the start of each honing operation, and mechanism operating in timed relation to the start of each honing operation for procuring a gradual reduction of the fluid pressure exerted on said means, whereby said expanded honing device exerts on each workpiece a gradually diminishing pressure for the remainder of the honing operation, until the latter is terminated by collapse of said honing device when the fluid-pressure opposing said spring gets low enough for said spring to act.

8. In a honing machine, an expansible and collapsible honing device, a spring arranged to expand said honing device and to give it a predetermined pressure against each workpiece, a second spring of greater strength than the first spring and arranged in opposition thereto, for procuring collapse of said honing device, a fluid-actuated member opposing said second spring, means brought into action at the start of each honing operation for subjecting said member to fluid under sufficient pressure to disable said second spring, thereby making said first spring fully effective for the expansion of said honing device, and the working pressure supplied thereto, and means operating in timed relation to the start of each honing operation for inaugurating a gradual reduction in the presence exerted by said fluid on said member, thereby to gradually diminish, during the remainder of the honing operation, the effective working pressure supplied by said first spring, until said second spring, by regaining its preponderance over said first spring procures the collapse of said honing device.

THE HEALD MACHINE COMPANY,
*Assignee of Hector R. Berard, Deceased.*
By SILAS T. MASSEY,
*Vice-President.*

(Seal) Acting Commissioner of Patents.

CERTIFICATE OF CORRECTION.

Reissue No. 22,423. January 25, 1944.

HECTOR R. BERARD, DECEASED.

It is hereby certified that error appears in the printed specification of the above numbered patent requiring correction as follows: Page 5, second column, line 2, for the word "presence" read --pressure--; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.